Nov. 5, 1935.                A. McL. NICOLSON                2,020,039
                              HOROLOGE SYSTEM
                           Filed Feb. 21, 1931           2 Sheets-Sheet 1

INVENTOR
Alexander McLean Nicolson
BY
ATTORNEY

Nov. 5, 1935.    A. McL. NICOLSON    2,020,039
HOROLOGE SYSTEM
Filed Feb. 21, 1931    2 Sheets-Sheet 2
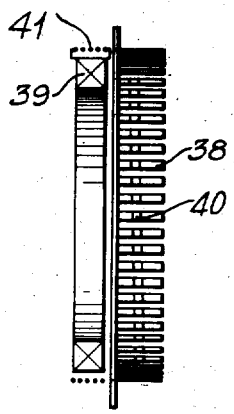
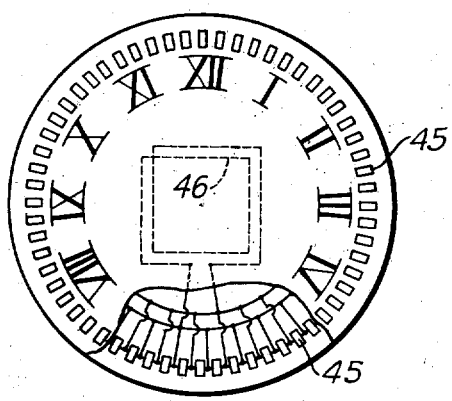
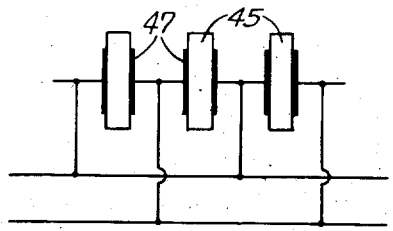
INVENTOR
Alexander McLean Nicolson
BY
ATTORNEY Patented Nov. 5, 1935

2,020,039

UNITED STATES PATENT OFFICE 2,020,039

HOROLOGE SYSTEM

Alexander McLean Nicolson, New York, N. Y., assignor to Communication Patents, Inc., New York, N. Y., a corporation of Delaware Application February 21, 1931, Serial No. 517,389

10 Claims. (Cl. 58—24)

This invention relates to electrical signalling systems, and particularly to horologe systems in which a periodically varying signal is transmitted for producing visual indications.

An object of the invention is to transmit and indicate at a receiving point uniform chronological sequences.

Another object of the invention is to transmit a periodically varying frequency to indicate time as a visual signal.

A further object of the invention is to transmit time signals which are directly receivable by an indicating instrument.

Hithertofore in the art, time signals have been transmitted for the purpose of maintaining horologe instruments in synchronism or at a uniform travel, and for adjustment of any loss of synchronism or variances in travel. For instance, it is well known in the art how a timepiece may be corrected at periodic intervals for any increase or decrease in speed. The disclosure of such a time correcting system may be found in my copending application Serial Number 489,571, filed October 18, 1930.

The present invention contemplates a system which utilizes the signals to actually indicate the particular instant of any period, the motive power or force required to adjust the instrument from instant to instant being obtained directly from a received signal which is transmitted continuously or at rapid intervals, depending upon how accurate a timepiece is desired. In brief, the invention operates as a meter, in that the frequency being received is indicated on the time keeping instruments, the proper frequency being received at the right instant. In one modification, reeds, tuned to a particular frequency or a narrow band of frequencies, are employed whose amplitude of vibration depends upon the strength of the received signal. The reeds are so adjusted that very little energy is required to vibrate them, and consequently no amplifiers or local power source is necessary to produce an indication within a considerable area surrounding a transmitter. Of course, with the larger receiving instruments in which the indicating reeds have considerable mass and inertia, a local energy source may be controlled by the incoming wave to produce the vibration of the indicating reeds.

Another embodiment of the invention contemplates the use of a set of piezoelectric elements having different dimensions and thereby tuned to a definite range of frequencies to which they will respond. Their response may be indicated by actual vibration of mechanical elements, or by the production of a visual indication in the form of a glow discharge. Both embodiments may operate from the same signals transmitted from the same transmitter simultaneously, and are being claimed in a divisional application Serial No. 603,675, filed April 6, 1932.

The transmitting end of the system may constitute cyclic variable frequency oscillators having their tuning controlled by a master timepiece. By mechanical coupling, the master mechanism continuously tunes the oscillators through a complete cycle of frequencies chosen for transmission. The mechanism controls several oscillating circuits, the tuning of each circuit being accomplished at a different rate such that one condenser is varied through a complete cycle during one hour, while the other condenser takes twelve hours to complete its period of variation. Such a variation is in accordance with the standard measurement of time.

The invention will be more fully understood by reference to the following description in conjunction with the accompanying drawings, in which:

Fig. 3 is a cross-sectional view of a receiving instrument.

Fig. 4 is a modification of the receiving system; and

Fig. 5 is a detail of the modification shown in Fig. 4.

Figure 1:
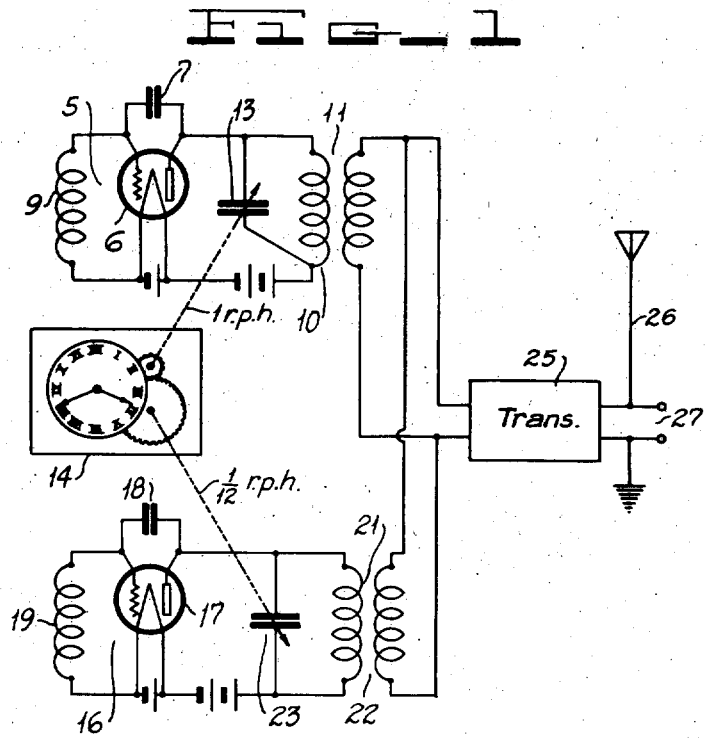
Figure 1 represents a diagrammatic circuit of a transmitter.

Referring particularly to Fig. 1, an oscillator circuit 5 is shown with a vacuum tube 6, coupling condenser 7, grid inductance 9 and a fixed tuning inductance 10, comprising the primary of an output transformer 11. A variable tuning capacity element 13 has its rotor mechanically connected to a master clock mechanism 14. This clock mechanism may be locally controlled in various ways such as by temperature adjustments to obtain accurate time indications therefrom. A similar oscillator circuit 16 includes a vacuum tube 17, coupling capacity 18, grid inductance 19 and fixed tuning inductance 21, comprising the primary of an output transformer 22. The variable tuning capacity 23 has its rotor connected to the master timing mechanism 14, and the construction of this mechanism is such that the ratio between driving elements is 12 to 1. The rotor, therefore, of the capacity element 13 is rotated as indicated at one revolution per hour, while the rotor of the capacity element 23 is rotated at one revolution in twelve hours.

The outputs of the two oscillators with their periodic varying frequency is impressed upon a transmitting circuit 25 of any well known type from which it may be broadcast over antenna 26 or transmitted over a wire line 27. The two oscillators generate the same band of frequencies, the difference between the two being that one generates its entire band in one hour's time, while the second generates the same band in a twelve hour period. The frequency range generated is, preferably, in the neighborhood of 600 cycles or multiple thereof, but may be of any desired width within practical limits and may lie within the broadcast frequency spectrum or in a lower frequency range, depending somewhat upon the medium of transmission.

Figure 2:
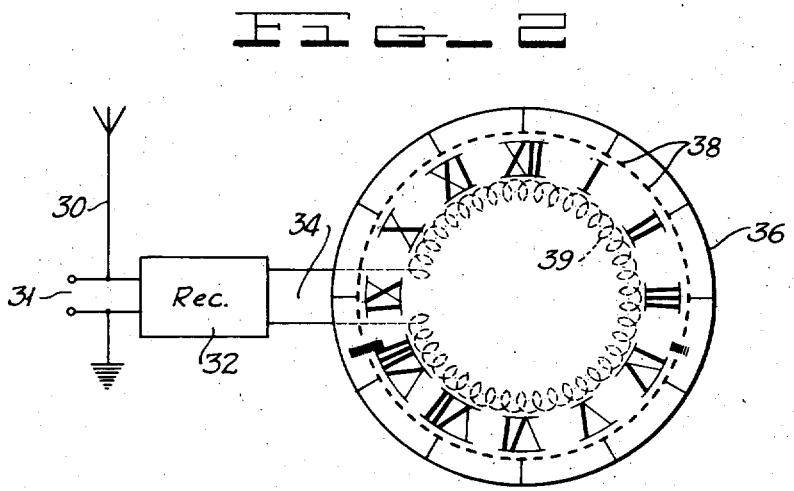
Fig. 2 is a diagrammatic sketch of a receiving system.

The receiving circuit shown in Fig. 2 employs an antenna 30 or wire line 31 with a receiver 32 of the ordinary amplifier type. It will, of course, be realized that this receiver may include a detector circuit as well as an amplifier in case a modulator is used at the transmitter for modulating a carrier wave with the low frequency band. Attached to the receiver 32 by conductors 34 is an indicating instrument 36 inscribed with a clock face. Around the circumference of the escutcheon plate is an equally spaced plurality of reeds 38, an end view thereof being shown in this drawing. Each reed has a construction differing from the others and is, therefore, resonant to a definite frequency. Each reed also has a piece of magnetic material 40 such as soft iron placed thereon which is affected by the currents in a winding 39.

In Fig. 3, the instrument 36 is shown in cross-section. Although in Fig. 2, the energy for vibrating the reeds 38 is obtained from the output of the receiver 32, the winding 39 of Fig. 3 receives energy directly from an antenna coil 41. This antenna coil 41 may be employed when the instrument is in sufficient proximity to the transmitting station for reed vibration without the supplementing of local power, local power being necessary only for operation at longer distances or for larger indications.

In addition to the adjustment of the two oscillators to obtain the same cyclic frequency bands, they are also adjusted as to amplitude of the generated frequency bands, that is, the one revolution per hour band is generated at a much greater amplitude than the slower changing frequency band. In consequence thereof, the reeds receiving the relatively stronger current will vibrate at a greater amplitude and distinguish themselves from the reeds receiving the weaker current, separation between frequencies being obtained by mechanical resonance. In accordance with the generation of these frequencies the reeds receiving the smaller amplitude current correspond to the hour hand of a timepiece, while the stronger signal vibrates the reeds corresponding to the minute hand.

Referring to Fig. 4, a plurality of crystals 45 are shown placed so as to form a closed path. A receiving antenna 46 which may be in any position with respect to the crystals, feeds the crystals through their electrodes 47 as shown in detail in Fig. 5. Each crystal is dimensioned to operate at one or a narrow band of frequencies as the cyclic frequency band is impressed upon the crystals. The indication that the crystal is operating is, preferably, in the form of a light spot or glow discharge on its visible surface. Each individual crystal may be placed in a partially evacuated transparent envelope as shown on page 18 of "Q. S. T." for September, 1926, a magazine published by the American Radio Relay League, Inc., at Hartford, Conn., or all of the crystals may be placed in a common annular envelope surrounding them or surrounding the entire apparatus. Furthermore, the envelopes may contain helium, neon or the like. If two spots are produced, the intensity between one or the other in accordance with the strength of the received signals may distinguish them. Another indication may take the form of reeds attached to the crystals themselves. Similar to the system of Fig. 2, the receiving instrument of Fig. 4 may be supplied from a local receiver with a much stronger signal strength than that obtained from the antenna 46 in case the instrument is used at long distances from the transmitter.

The operation of the system is obvious from the above description of the apparatus, but will be briefly reviewed. The oscillators 5 and 16 at the transmitter each produce the same band of frequencies having the same range. The production of these bands, however, is at different rates, the oscillator 5 generating its band in one hour, while the oscillator 16 produces the same band in twelve hours. Let us assume for purposes of description that the band has a range of 600 cycles lying between the limits of 5000 and 5600 cycles. We will further assume that the instrument 36 shown at Fig. 2 has on its face a termination of 60 reeds which permits five reeds for each hour, or a reed for each minute as measured by the minute indicator. Let us further assume that each reed is tuned ten cycles apart, that is, the reed at the one o'clock position is resonant to a frequency band of 5000 cycles plus or minus five cycles, the reed indicating six minutes after one will then be tuned to a frequency of 5010 cycles plus or minus five cycles, while the reed showing seven minutes will then be tuned to a frequency of 5020 cycles, and so on for the remainder of the sixty reeds. To provide the proper timing of the frequency to the reeds, the clock 14 varies the frequency of the oscillator 5 at the rate of ten cycles per minute or 600 per hour, while the frequency of the oscillator 16 is varied at the rate of 50 cycles per hour. Furthermore, the oscillator 5 has a larger output amplitude than the oscillator 16, causing the reed which varies at the rate of ten cycles per minute to have a larger swing and is, therefore, the minute hand. The slower changing frequency from the oscillator 16 operates the reeds at a smaller amplitude at the rate of 50 cycles per hour, and consequently constitutes the hour hand. The same relationship controls the glow discharge of the crystals 45 in the system shown in Fig. 4. By starting the oscillators at the same instant to produce the lowest frequency in their bands, and this starting point occurring at one o'clock in accordance with the above assumptions, then the proper relationship will be maintained thereafter to operate the indicating instrument as an accurate timepiece. The above frequency values are given here for the purpose of illustrating the operation of the system, it being understood that a frequency range of 60 cycles or any multiple thereof may be used to provide similar results.

Although the invention has been described in connection with horologe instruments, it is applicable to other uses in which a visual indication is required of certain events in a chronological order, such as stock reports, etc., the full scope of the invention being defined by the appended claims.

What is claimed is:

1. In an electrical transmission system, means for transmitting two cyclic varying frequency currents of different amplitudes, sources of said currents, means for receiving said currents at a receiving point, a plurality of mechanically tuned reeds located in a closed path, and means for impressing upon said reeds said cyclic varying currents, said reeds vibrating when receiving a current of the frequency to which any particular reed is tuned, the degree of vibration distinguishing between said current sources.

2. In an electrical transmission system, means for generating two cyclic varying frequency currents of different amplitudes, means for receiving said currents at a distant station, a plurality of piezoelectric crystal devices having different resonant points, means for impressing upon said crystals the received currents, said crystals responding to the current received when the frequency is that to which any of said crystals are resonant, said crystal response being in the form of a glow discharge of a density proportional to the strength of the frequency received.

3. In an electrical transmission system, a plurality of sources for generating two cyclic varying frequency currents having constant amplitudes of different values, means for transmitting said currents to a receiving point, a plurality of mechanically resonant bodies, means at said receiving point for impressing said currents simultaneously upon said plurality of mechanically resonant bodies, and means for producing from said bodies a visual indication of the received currents when the currents have a frequency at which the bodies are mechanically resonant, said bodies distinguishing between said sources by the particular amplitude of vibration.

4. In an electrical transmission system, a master timepiece having an hour hand and a minute hand, means for generating two constant amplitude cyclic varying frequency currents of different values, one of said currents varying in frequency in accordance with the movements of said hour hand and the other varying in frequency in accordance with the movement of said minute hand, and a plurality of indicating bodies upon which said currents may be impressed, said indicating bodies operating in accordance with the frequency of the currents transmitted and in intensity in accordance with the amplitude of the currents to distinguish the movements of the hour hand from the minute hand.

5. In an electrical transmission system, a master time piece having hour and minute hands, a plurality of generators of alternating currents, one of said generators varying the frequency of its current in accordance with the hour hand and another of said generators varying the frequency of its current in accordance with the minute hand of said time piece, said currents having a difference in amplitude to distinguish between said hands, and means including a plurality of indicating bodies arranged as a time piece, said bodies indicating the position of said hour and minute hands by their actuation by the frequency of said currents and distinguishing between said hands by the intensity of the actuation.

6. In an electrical signalling system, a plurality of generators of electrical currents having different characteristics, means for changing the frequency of said currents at a uniform rate, said means maintaining the same ratio of change between said currents, a transmission medium for said signals terminating at a distant point, and means for detecting the received signals visually, said means detecting the difference between the frequencies by resonance and between amplitudes of the currents by amplitudes of mechanical vibration.

7. In an electrical transmission system, a master timepiece having mechanical elements which move at different velocities bearing a constant ratio to each other, a plurality of generators of electrical currents, means for varying the frequency of generation of the currents from one of said generators in proportion to the velocity of movement of one of said elements, means for varying the frequency of generation of the currents from another of said generators in proportion to the velocity of movement of a second element of said timepiece, said different frequency currents having constant amplitudes of different values, means for combining the output of the generators, a transmission system for transmitting said varying frequency currents to a receiver, and a frequency selective indicator at said receiver for indicating the frequency variation of each of said generators, the particular amplitude of variation indicating the particular transmitting generator.

8. In an electrical transmission system, a master time clock, an electrical generating system of a definite frequency, mechanical connections between said time clock and said generating means for varying the frequency of the output of said generator, a second generator of electrical currents, a mechanical connection between said time clock and said second generator for varying the frequency of the currents generated by said second generator, the generation of currents in said respective generators being at different amplitudes and maintained at a substantially definite ratio with respect to one another, means for transmitting the output of said generators to a receiving point, a receiving device at said receiving point for transforming said electrical currents into visual indications of the particular frequency being received, and common means for indicating on said receiver the changes in said received frequency.

9. In an electrical transmission system, a master timepiece, a plurality of generators of alternating currents of different amplitudes, means for varying the frequency of the currents generated by each of said generators in a certain cyclic manner, means for connecting said last mentioned means to said master timepiece for the operation thereof at different rates of change, means for transmitting said currents to a receiving point, means for transforming said received currents into visual indications, said means distinguishing between the frequencies of each generator and indicating the particular generator in which the frequency change occurs by a particular amplitude.

10. In an electrical transmission system, a plurality of generators of alternating currents, means for changing the frequencies of said currents at a uniform rate different for each generator, said currents having constant amplitudes different for each generator, means for transmitting said currents to a receiver, and means for impressing said received currents on a frequency selective device, said device distinguishing between said generators by the amplitude of the current at each frequency and between the particular frequencies.

ALEXANDER McLEAN NICOLSON.